(12) United States Patent
Ciocari et al.

(10) Patent No.: US 11,775,315 B2
(45) Date of Patent: Oct. 3, 2023

(54) BIOS CODE TO STORE OPERATING SYSTEMS ON COMPUTER-READABLE MEDIA

(71) Applicant: Hewlett-Packard Development Company, L.P., Spring, TX (US)

(72) Inventors: Juliano Francisco Cagnini Ciocari, Porto Alegre (BR); Charles Ricardo Staub, Porto Alegre (BR); Paulo Alcantara, Porto Alegre (BR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/481,203

(22) PCT Filed: Jan. 31, 2018

(86) PCT No.: PCT/US2018/016289
§ 371 (c)(1),
(2) Date: Jul. 26, 2019

(87) PCT Pub. No.: WO2019/152030
PCT Pub. Date: Aug. 8, 2019

(65) Prior Publication Data
US 2021/0334108 A1  Oct. 28, 2021

(51) Int. Cl.
*G06F 9/44* (2018.01)
*G06F 9/4401* (2018.01)
*G06F 8/61* (2018.01)

(52) U.S. Cl.
CPC .............. *G06F 9/4406* (2013.01); *G06F 8/63* (2013.01)

(58) Field of Classification Search
None
See application file for complete search history.

(56) References Cited

U.S. PATENT DOCUMENTS

| | | | |
|---|---|---|---|
| 6,751,658 | B1 | 6/2004 | Haun et al. |
| 7,127,596 | B2 | 10/2006 | Rich et al. |
| 7,136,994 | B2 | 11/2006 | Zimmer et al. |
| 7,849,454 | B2 | 12/2010 | Lambert et al. |
| 7,865,775 | B2 | 1/2011 | Yao et al. |
| 8,230,210 | B1 | 7/2012 | Polyudov |

(Continued)

FOREIGN PATENT DOCUMENTS

| | | |
|---|---|---|
| JP | 2003114800 | 4/2003 |
| JP | 2005316809 A | 11/2005 |

(Continued)

OTHER PUBLICATIONS

Nystrom, Magnus, et al., UEFI Networking and Pre-OS Security, Oct. 2011, Researchgate.

(Continued)

*Primary Examiner* — Fahmida Rahman
(74) *Attorney, Agent, or Firm* — Quarles & Brady LLP (57) ABSTRACT

A computer system may comprise a non-volatile memory to store executable Basic Input/Output System (BIOS) code, a computer-readable medium to store an operating system based on an image, and a processor coupled to the non-volatile memory and the computer-readable medium. Execution of the executable BIOS code may cause the processor to store the operating system to the computer-readable medium based on the image.

20 Claims, 6 Drawing Sheets

(56) References Cited

U.S. PATENT DOCUMENTS

| | | | |
|---|---|---|---|
| 9,342,316 B1* | 5/2016 | Sivertsen | G06F 9/441 |
| 2004/0006689 A1 | 1/2004 | Miller et al. | |
| 2004/0255106 A1 | 12/2004 | Rothman et al. | |
| 2005/0289288 A1 | 12/2005 | Matheny et al. | |
| 2006/0005016 A1 | 1/2006 | Lee et al. | |
| 2006/0010315 A1 | 1/2006 | Brown et al. | |
| 2007/0143589 A1* | 6/2007 | Rawe | G06F 9/441 |
| | | | 713/2 |
| 2008/0250476 A1* | 10/2008 | Myers | G06F 21/34 |
| | | | 726/4 |
| 2015/0116342 A1* | 4/2015 | Haase | G06T 1/60 |
| | | | 345/555 |
| 2015/0331694 A1* | 11/2015 | Balakrishnan | G06F 9/4401 |
| | | | 713/2 |
| 2016/0364297 A1* | 12/2016 | Lo | G06F 11/1417 |
| 2017/0147361 A1 | 5/2017 | Kirvan et al. | |
| 2017/0249133 A1* | 8/2017 | Herzi | G06F 8/65 |
| 2018/0276002 A1* | 9/2018 | Roszak | G06F 9/4406 |
| 2019/0042583 A1* | 2/2019 | Tierney | G06F 16/10 |

FOREIGN PATENT DOCUMENTS

| | | |
|---|---|---|
| JP | 2006040301 | 2/2006 |
| JP | 2009059343 A | 3/2009 |
| JP | 2009509265 A | 3/2009 |
| JP | 2010009259 | 1/2010 |
| JP | 2012058803 | 3/2012 |
| JP | 2012252701 | 12/2012 |
| JP | 2013543200 | 11/2013 |

OTHER PUBLICATIONS

Wilkins, Richard, et al., UEFI Secure Boot in Modern Computer Security Solutions, Sep. 2013, UEFI Organisation.

* cited by examiner

BIOS CODE TO STORE OPERATING SYSTEMS ON COMPUTER-READABLE MEDIA

BACKGROUND

Basic Input/Output System (BIOS) code may be executed at startup of a computer system to initialize sub-systems of the computer system before beginning execution of the operating system (OS). Such sub-systems may include a drive, such as a disk drive or solid state drive, a network interface connector, a graphics card, and a printer. The BIOS code may also be used to install or re-install the OS onto the computer system.

BRIEF DESCRIPTION OF THE DRAWINGS

Various examples are described below referring to the following figures.

DETAILED DESCRIPTION

Computer systems occasionally install or re-install their OS for various reasons. This may occur when the computer system is first built, the OS is corrupted, or the computer system is to be switched to use a different OS. After execution of the BIOS code initializes the computer system, the computer system may execute a lightweight OS (a fully functioning OS with a limited feature set and relatively small executable code size) to store or install an OS on the computer system. The lightweight OS may have been previously stored on the computer system for this purpose, or the computer system may download the lightweight OS from a network location when the computer system's OS is to be received or replaced.

The BIOS code may include instructions to store or install an OS on the computer system. With these instructions in the BIOS code, the computer system may store or install the OS on the computer system without executing a lightweight OS.

In some examples, a computer system comprises a non-volatile memory to store executable Basic Input/Output System (BIOS) code; a computer-readable medium to store an operating system based on an image; and a processor coupled to the non-volatile memory and the computer-readable medium. Execution of the executable BIOS code is to cause the processor to store the operating system to the computer-readable medium based on the image.

In some examples, a device comprises a non-volatile memory comprising computer-executable Basic Input/Output System (BIOS) code, where execution of the computer-executable BIOS code by a processor causes the processor to store an operating system on a computer-readable medium coupled to the processor, and where storage of the operating system on the computer-readable medium is based on an image that includes operating system information.

In some examples, a method comprises executing Basic Input/Output System (BIOS) code, by a processor, to initialize a computer system; receiving an image by the computer system; and executing the BIOS code, by the processor, to install an operating system on a computer-readable medium of the computer system. The operating system is based on the image.

Figure 1A:
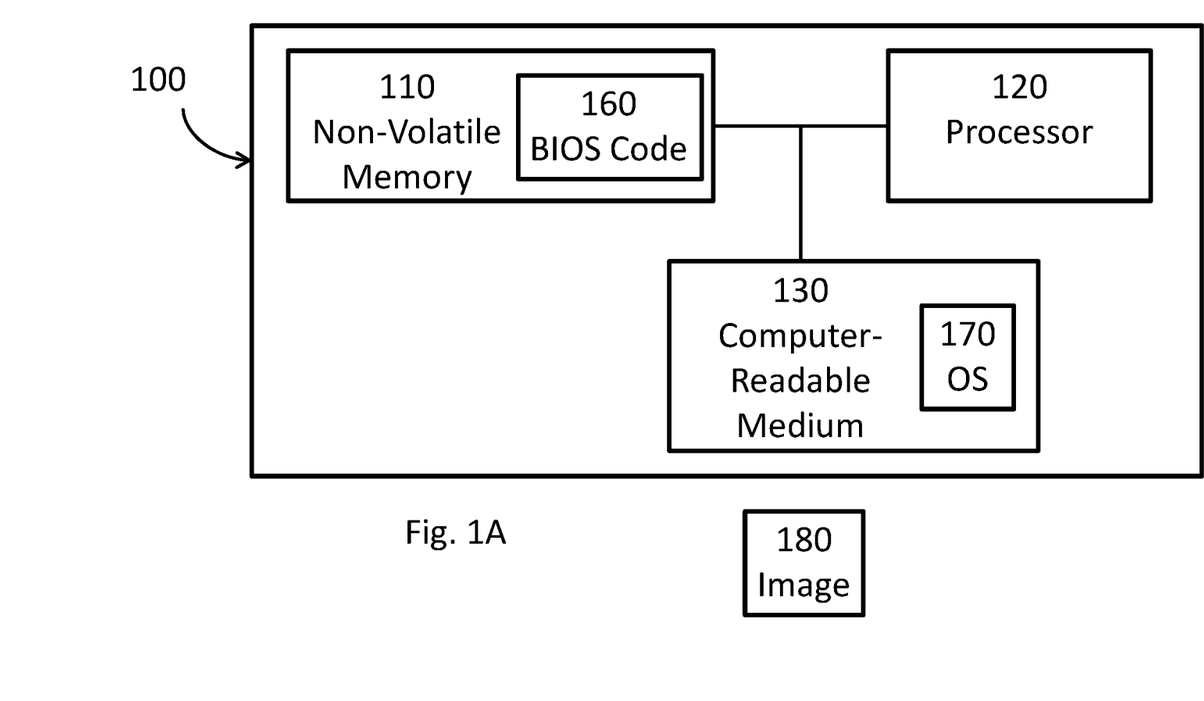
FIG. 1A shows a computer system and image in accordance with various examples.

FIG. 1A shows a computer system 100 and image 180 in accordance with various examples. The computer system 100 may comprise the non-volatile memory 110, the processor 120, and the computer-readable medium 130. The non-volatile memory 110 stores BIOS code 160. The computer-readable medium 130 stores an OS 170. In various examples, the computer system 100 may comprise the image 180—for example, stored on the computer-readable medium 130 or the non-volatile memory 110. In various examples, the image 180 may be on a removable medium, such as a compact disc (CD) or a digital versatile disc (DVD), or on a network location accessible by the computer system 100.

Figure 1B:
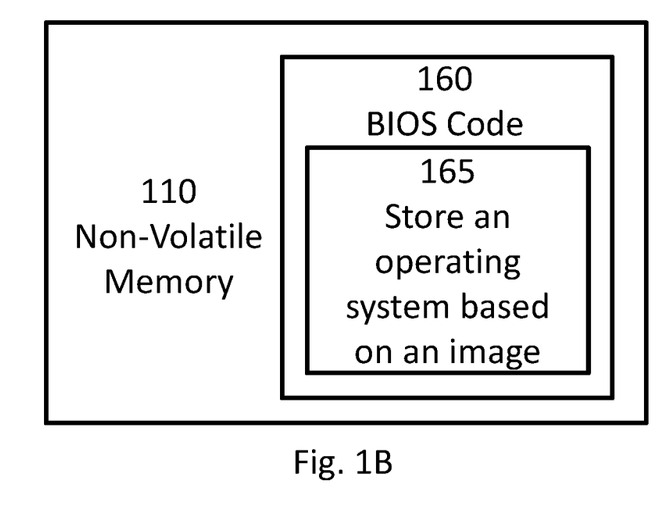
FIG. 1B shows a non-volatile memory in accordance with various examples.

FIG. 1B shows the non-volatile memory 110 in accordance with various examples. The non-volatile memory 110 comprises BIOS code 160. The BIOS code 160 may include instructions to store an operating system based on an image 165.

Figure 1C:
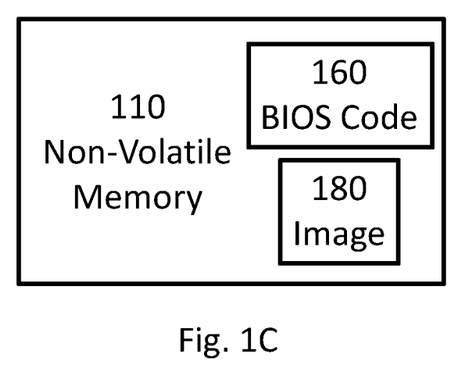
FIG. 1C shows a non-volatile memory in accordance with various examples.

FIG. 1C shows the non-volatile memory 110 in accordance with various examples. The non-volatile memory comprises BIOS code 160 and the image 180.

Figure 1D:
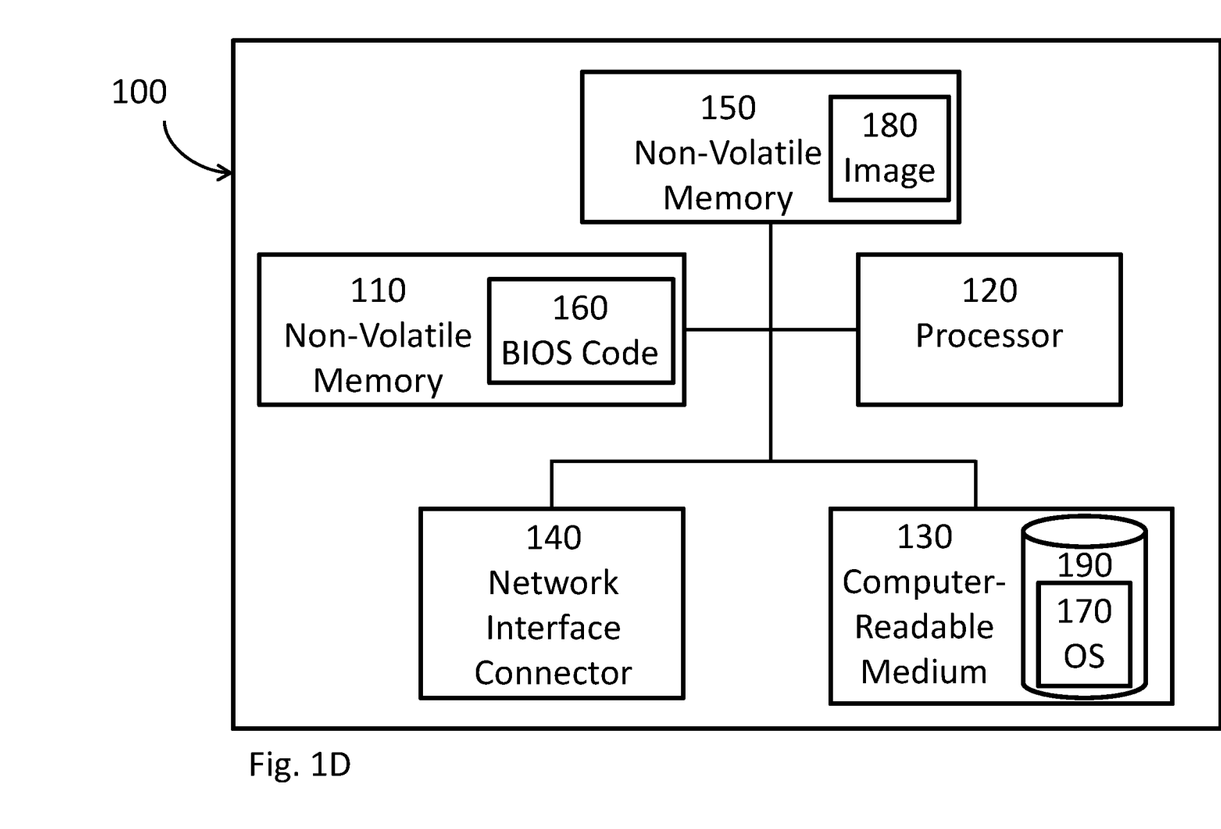
FIG. 1D shows a computer system in accordance with various examples.

FIG. 1D shows the computer system 100 in accordance with various examples. Computer system 100 includes the non-volatile memory 110, the processor 120, the computer-readable medium 130, the network interface connector 140, and the non-volatile memory 150. Non-volatile memory 110 includes BIOS code 160. Non-volatile memory 150 includes image 180. Computer-readable medium 130 includes a disk drive 190. The disk drive 190 stores the OS 170.

Referring generally to FIGS. 1A-1D, according to various examples, the computer system 100 may be a desktop or laptop computer system, a server, or a part of a factory control system or an Internet of Things (IoT) device. Other computer systems 100 are also contemplated. The computer system 100 may comprise a single OS 170 for execution or may comprise multiple OSes for possible execution. The computer system may instantiate a virtual computer that runs an OS 170.

According to various examples, the non-volatile memories 110, 150 may be read-only memory (ROM), electrically erasable programmable read-only memory (EEPROM), a disk drive 190, or a solid-state drive. Other kinds of non-volatile memory 110, 150 are also contemplated. Although some memories are referred to as "read-only," it may still be possible to write to such memories. For example, it may be possible to write data to an EEPROM, even though it is classified as a "read-only memory."

According to various examples, the processor 120 may comprise a microprocessor, a microcomputer, a controller, or a microcontroller. The processor 120 may have a single core or multiple processing cores. Other kinds of processors 120 are also contemplated.

According to various examples, computer-readable medium 130 may be a disk drive 190, a solid-state drive (SSD), random access memory (RAM), or some other form of volatile or non-volatile memory. Other kinds of computer-readable media 130 are also contemplated.

According to various examples, the network interface connector 140 may be an Ethernet card, a wireless Ethernet connector, a Bluetooth connector, or another type of network connector. The network interface connector 140 may have a wired connection to the network or may connect wirelessly. The network interface connector 140 may connect to the Internet, an intranet, a public network, an ad hoc network, or some other network. The network interface connector 140 may allow access to more than one network or more than one type of network. Other kinds of network interface connectors 140 are also contemplated.

According to various examples, the non-volatile memory 110 may be an EEPROM on a motherboard of the computer system 100. In some examples, the non-volatile memory 110 stores BIOS code 160. BIOS code 160 may include Extensible Firmware Interface (EFI) code, Unified Extensible Firmware Interface (UEFI) code, and other updates, versions, revisions, and successors to the BIOS code 160, EFI code, or UEFI code. The BIOS code 160 may be computer-executable code to be executed by the processor 120. At startup, the processor 120 may execute the BIOS code 160 to initialize the computer system 100. During initialization, the BIOS code 160 may cause the processor 120 to initialize the network interface connector 140, such as a wireless Ethernet connector, to establish a connection to a network, such as a local area network. The local area network may be part of an intranet and ultimately connect the computer system to the Internet. During initialization, the BIOS code 160 may cause the processor 120 to initialize the computer-readable medium 130, such as an SSD, to allow for storing and retrieving data from the computer-readable medium 130. The computer-readable medium 130 may store an OS 170 and applications for executing on the computer system, as well as any corresponding OS data or application data. In some examples, the OS 170 or OS data may be stored on a separate computer-readable medium 130 than the applications or application data. During initialization, the BIOS code 160 may cause the processor to initialize other subsystems, such as a graphics card, a sound card, or connections to peripheral devices, such as mice or keyboards. Once the computer system 100 has been initialized, the BIOS code 160 may allow the processor 120 to begin executing the OS 170, which may be stored on the computer-readable medium 130.

According to various examples, before the BIOS code 160 allows the processor 120 to begin executing the OS 170, the BIOS code 160 may install or re-install the OS 170. The OS installation may be part of an automatic process or it may be manually prompted. For example, the BIOS code 160 may determine that no OS 170 is available, such as by detecting whether the computer system 100 includes a bootable device. If no OS 170 is available, the BIOS code 160 may automatically install an OS 170. In some examples, a local user may manually prompt the BIOS code 160 to install an OS 170 through the use of menu screens. The computer system 100 may allow a local user to access such menu screens by pressing a key or combination of keys during startup, such as pressing the Delete key or pressing the SHIFT and F8 keys together. For example, a systems administrator may access the computer system 100 remotely through the network interface connector 140 and instruct the BIOS code 160 to perform an installation the next time the computer system 100 is started up or to presently initiate such an installation.

According to various examples, the OS 170 may be installed by itself or it may be part of an installation of the OS 170 and additional data, such as an application or application data. For example, the image 180 may include an OS 170, a word processing program, and word processing documents. The OS 170 may be installed as part of installing an image 180 on a drive. The image 180 may overwrite data stored on a drive, including a previously-installed operating system, applications, and data. The image 180 may specify a particular partitioning of the drive, or specify a particular file system format, such as New Technology File System (NTFS) or File Allocation Table 32 (FAT32). The image 180 may be a single file or a collection of files, any of which may be a compressed file.

According to various examples, the OS 170 may be installed by running an installation program, copying an image 180 onto a computer-readable medium, or copying an image 180 onto a drive. Storing the OS 170 on a computer-readable medium may include partitioning and formatting the computer-readable medium.

According to various examples, the image 180 used to install the OS 170 may be stored locally or accessed remotely via the network interface connector 140. Locally, the image 180 may be stored on computer-readable medium 130, on non-volatile memory 150 on a motherboard of the computer system 100, or on the same non-volatile memory 110 that stores the BIOS code 160. The image 180 may be stored on removable media, such as a CD, a DVD, or a Universal Serial Bus (USB) thumb drive. The computer system 100 may allow a local user or a remote user to select whether to use a local or a remote image 180 and to select between multiple different images or image locations. After installing the OS 170, the BIOS code 160 may instruct the processor 120 to begin executing the OS 170, or the BIOS code 160 may restart the computer system 100 before execution of the OS 170 begins.

According to various examples, the BIOS code 160 may not implement the functionality of a full OS 170 in order to install or store an image 180 on a computer-readable medium 130. The BIOS code 160 may be capable of downloading a file, such as an image 180, over the network interface connector 110, partitioning the computer-readable medium 130, formatting the computer-readable medium 130 or a partition thereof, performing input and output operations on the computer-readable medium 130, or verifying the image 180, along with other functionality. The BIOS code 160 may verify the image 180 before storing or installing the OS 170 to the computer system 100. Verifying the image 180 may include verifying a digital signature accompanying the image 180, using appropriate cryptographic techniques. Image verification may be used to check that the image 180 was created or approved by a trusted source, such as the Information Technology (IT) department of a company. The BIOS code 160 may perform image verification before installing the OS 170 on the computer system 100. Image verification may include performing a Cyclical Redundancy Check (CRC). A CRC may be used to check if the image 180 has been corrupted, such as by a virus or disk failure. In installing or storing the OS 170 to the computer-readable medium 130, the BIOS code 160 may create a virtual disk in volatile memory of the computer system 100.

According to various examples, the BIOS code 160 may store the location of the image 180. The location may be a location in the non-volatile memory 110 that also stores the BIOS code 160. The location may be a location in the non-volatile memory 150. The location may be a location in the computer-readable medium 130. The location may be a network location accessible through the network interface connector 140. The location of the image 180 stored in the BIOS code 160 may be updated to specify a different location. The location indicated by the BIOS code 160 may be updated at the time the image is to be stored or installed on the computer-readable medium 130. The location indicated by the BIOS code 160 may be updated in circumstances disconnected with the storage or installation of the OS 170, such as the replacement of a network drive where the image 180 may be stored. The location indicated by the BIOS code 160 may be updated by entering the BIOS code 160 setup and specifying a different location in the BIOS code 160 settings. The location indicated by the BIOS code 160 may be updated remotely via the network interface connector 140, such as by a systems administrator.

According to various examples, if the image 180 is to be stored or installed on the computer-readable medium 130, the BIOS code 160 may query the stored location of the image 180. The stored location of the image 180 may be a network location accessible through the network interface connector 140. The BIOS code 160 may cause the computer system 100 to download the image 180 from the network location through the network interface connector 140. The image 180 may be stored temporarily in a volatile memory of the computer system or on the computer-readable medium 130. The image 180 may be downloaded piecewise through the network interface connector 140 as the image is needed. According to various examples, the OS 170 may be stored or installed on the computer-readable medium 130 by performing a sector-based copy of data from the image 180 onto the computer-readable medium 130, such as when cloning a disk. The BIOS code 160 may cause the processor to download a sector from the image 180 on the network location and copy it a sector of the computer-readable medium 130. The computer system 100 may only store a portion of the image 180 at a time as it performs a sector-by-sector storage or installation of the OS 170. The image 180 may specify certain sectors of the computer-readable medium 130 are to store certain data. In case of a bad sector on the computer-readable medium 130, the BIOS code 160 may reassign data to a different sector on the computer-readable medium 130 and appropriately modify data to reference the reassigned sector. According to various examples, the OS 170 may be stored or installed on the computer-readable medium by executing code found in the image 180. The code in the image 180 may specify the installation of files without regards to a specific sector.

According to various examples, the BIOS code 160 may store the location of information to find the location of the image 180. The location of the information may be in the non-volatile memory 110, the non-volatile memory 150, the computer-readable medium 130, or at a network location accessible through the network interface connector 140. The location of the information may be updated independently or in connection with storing or installing the OS 170 on the computer-readable medium 130 based on the image 180. The location of the information may indicated by the BIOS code 160 be updated by entering the BIOS code 160 setup and specifying a different location in the BIOS code 160 settings. The location of the information indicated by the BIOS code 160 may be updated remotely via the network interface connector 140, such as by a systems administrator. According to various examples, the location of the information to find the location of the image 180 may be a network location. The network location may exchange data with the computer system 100 to determine which image 180 should be used to store or install the OS 170. Two different computer systems 100 may access the same network location to find the location of the image 180 to use, but the network location may specify a different image 180 for each computer system 100, such as based on a unique identifier of the computer system 100, a role the computer system 100 is to perform, or other information.

According to various examples, the BIOS code 160 may store an alternate location to find the image 180 or information to find the location of the image 180. The BIOS code 160 may display menu screens for selection of a different location of the image 180 or information to find the location of the image 180. According to various examples, there may be multiple layers of redirection to find the location of the image 180, such as the BIOS code 160 storing a first location on the computer-readable medium 130, that stores a central network location that manages all computers for a corporate network, that stores a local network location where the image 180 is actually stored.

According to various examples, the image 180 may include multiple files. The files may include compressed files, such as CAB files. Other file compression formats may be used. CAB files allow multiple files to be combined and spread across multiple CAB files to improve compression ratios. Decompression of a file may depend on having access to multiple CAB files. According to various examples, files may be compressed individually. Files may be compressed together into one compressed file, and not spread across multiple compressed files. The files may include sector data to be copied to a particular sector of the computer-readable medium 130 or the files may be placed in a particular directory of a file system on the computer-readable medium 130.

According to various examples, the image 180 may be a Windows image file (WIM). The WIM may include files, file attributes, directories, and other information for installing an OS 170 onto the computer system 100. The WIM may also include files, file attributes, directories, and other information for installing applications or data files onto the computer system 100.

According to various examples, the BIOS code 160 may include instructions to create a partition on the computer-readable medium 130 for storage of the image 180. The BIOS code 160 may include instructions to partition the computer-readable medium 130 in preparation for installation or storage of the OS 170. The BIOS code 160 may include instructions for extracting files, file attributes, directories, and other information from the image 180. The BIOS code 160 may include instructions for creating directories in a file system of the computer-readable medium 130, according to directories and information in the image 180, and copying files into the directories, such as files extracted from the image 180. The BIOS code 160 may include instructions to set-up boot data, such as by placing boot information in a specific filename in a specific directory of the file system of the computer-readable medium 130. The computer system 100 may look for that specific file at that specific directory location when booting the OS 170. The BIOS code 160 may include instructions to delete the partition it created to hold the image 180 on the computer-readable medium 130, such as by expanding the partition size of another partition on the computer-readable medium 130. The BIOS code 160 may include instructions to reboot the computer system 100, which may include re-running portions of the BIOS code 160 that initialize various parts of the computer system 100.

Figure 2A:
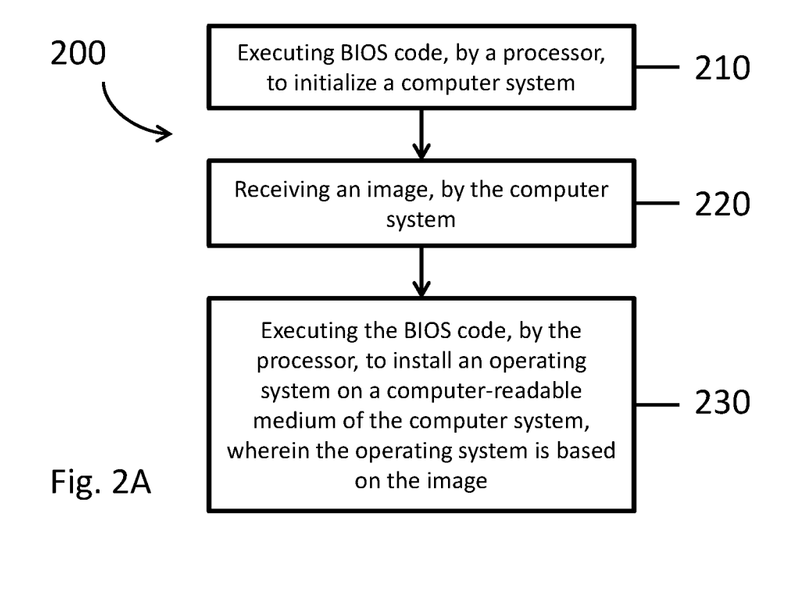
FIG. 2A shows a flow diagram in accordance with various examples.

FIG. 2A shows a flow diagram of an illustrative method 200 in accordance with various examples. The method 200 includes executing BIOS code, by a processor, to initialize a computer system (numeral 210). The method 200 includes receiving an image, by the computer system (numeral 220). The method 200 includes executing the BIOS code, by the processor, to install an operating system on a computer-readable medium of the computer system, where the operating system is based on the image (numeral 230).

Figure 2B:
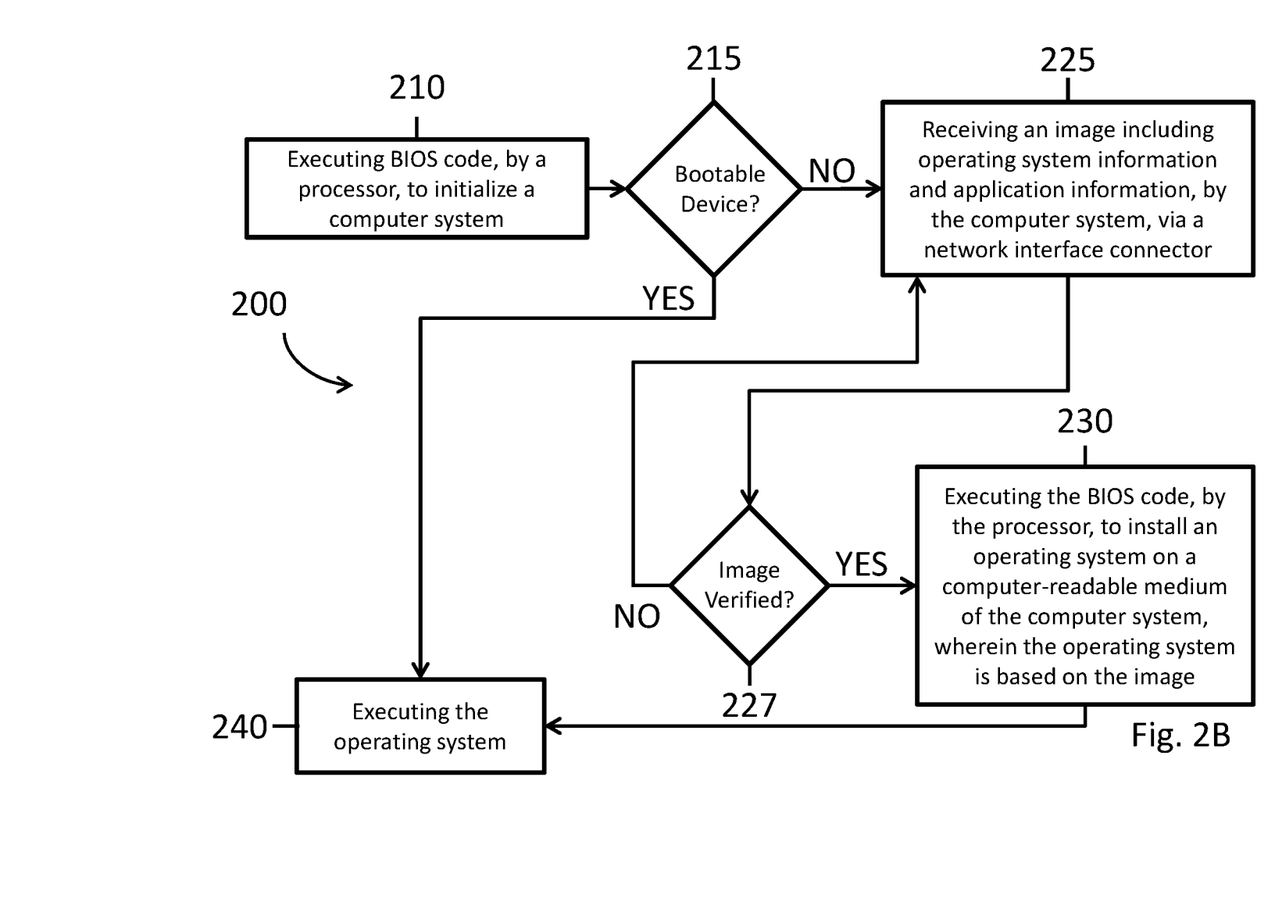
FIG. 2B shows a flow diagram in accordance with various examples.

FIG. 2B shows a flow diagram in accordance with various examples. The method 200 includes executing BIOS code, by a processor, to initialize a computer system (numeral 210). The method 200 includes detecting whether the computer system includes a bootable device (numeral 215). The method 200 includes receiving an image including operating system information and application information, by the computer system, via a network interface connector (numeral 225). The method 200 includes verifying the image (numeral 227). The method 200 includes executing the BIOS code, by the processor, to install an operating system on a computer-readable medium of the computer system, where the operating system is based on the image (numeral 230). The method 200 includes executing the operating system (numeral 240). If the method 200 detects a bootable device (numeral 215) (YES), it performs executing the operating system (numeral 240). If the method 200 does not detect a bootable device (numeral 215) (NO), it performs receiving an image including operating system information and application information by the computer system, via a network interface connector (numeral 225). If the method 200 successfully verifies the image (numeral 227) (YES), it performs executing the BIOS code, by the processor, to install an operating system on a computer-readable medium of the computer system, where the operating system is based on the image (numeral 230). If the method 200 is unable to verify the image (numeral 227) (NO), it performs receiving an image including operating system information and application information, by the computer system, via a network interface connector (numeral 225).

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A computer system comprising:
 a computer-readable medium;
 a volatile memory;
 a non-volatile memory to store executable Basic Input/Output System (BIOS) code; and
 a processor coupled to the non-volatile memory, the volatile memory, and the computer-readable medium, wherein execution of the executable BIOS code is to cause the processor to:
  detect that the computer system does not include any bootable device;
  receive an image in response to detecting that the computer system does not include any bootable device;
  store the image temporarily in the volatile memory by creating a virtual disk;
  create a partition on the computer-readable medium;
  verify the image based on a digital signature accompanying the image; and
  store an operating system to the computer-readable medium based on the image stored in the volatile memory and based on the partition in response to verifying the image based on the digital signature accompanying the image.

2. The computer system of claim 1, wherein the non-volatile memory comprises information regarding a location of the image.

3. The computer system of claim 2, comprising a network interface connector coupled to the processor, wherein the location of the image is a network location, and wherein execution of the BIOS code is to cause the processor to download the image via the network interface connector, based on the information regarding the location of the image.

4. The computer system of claim 1, comprising a second non-volatile memory to store the image.

5. The computer system of claim 1, comprising:
 a network interface connector, coupled to the processor, to receive the image.

6. The computer system of claim 1, wherein the executable BIOS code further includes additional computer-executable instructions to delete the partition created on the computer-readable medium for storage of the image.

7. The computer system of claim 1, wherein the executable BIOS code further includes additional computer-executable instructions to format the computer-readable medium before installing the operating system on the computer readable medium.

8. The computer system of claim 1, wherein the executable BIOS code further includes additional computer-executable instructions to create a directory in a file system of the computer-readable medium according to a file system format specified by the image.

9. The computer system of claim 1, wherein execution of the executable BIOS code is to cause the processor to verify the image based on the digital signature accompanying the image by verifying that the image was created or approved by a trusted source using cryptographic techniques.

10. A method comprising:
 executing Basic Input/Output System (BIOS) code, by a processor coupled to a computer-readable medium, to initialize a computer system, wherein the BIOS code includes computer-executable instructions;
 executing the BIOS code, by the processor, to detect that the computer system does not include any bootable device;
 executing the BIOS code, by the processor, to receive an image in response to detecting that the computer system does not include any bootable device;
 executing the BIOS code, by the processor, to temporarily store the image in a volatile memory of the computer system by creating a virtual disk;
 executing the BIOS code, by the processor, to create a partition on the computer-readable medium;
 executing the BIOS code, by the processor, to verify the image based on a digital signature accompanying the image; and
 executing the BIOS code, by the processor, to install an operating system on the computer-readable medium based on the image stored in the volatile memory and based on the partition in response to verifying the image based on the digital signature accompanying the image.

11. The method of claim 10, comprising connecting to a network to download the image.

12. The method of claim 10, wherein receiving the image comprises receiving a compressed file.

13. The method of claim 10, wherein the image includes operating system information and application information.

14. The method of claim 10, wherein verifying the image based on the digital signature accompanying the image comprises verifying that the image was created or approved by a trusted source using cryptographic techniques.

15. The method of claim 10, comprising executing the operating system.

16. A device comprising:
a volatile memory; and
a non-volatile memory comprising computer-executable Basic Input/Output System (BIOS) code, wherein execution of the computer-executable BIOS code by a processor causes the processor to:
detect that the device is not a bootable device;
receive an operating system image in response to detecting that the device is not the bootable device;
store the image temporarily in the volatile memory by creating a virtual disk;
create a partition on a computer-readable medium for storage of the image;
verify the image based on a digital signature accompanying the image; and
in response to verifying the image based on the digital signature accompanying the image, store an operating system to the computer-readable medium based on the image stored in the volatile memory and based on the partition.

17. The device of claim 16, wherein the non-volatile memory comprises the image.

18. The device of claim 16, wherein execution of the BIOS code by the processor causes the processor to store information in the non-volatile memory regarding the location of the image.

19. The device of claim 16, wherein the image comprises a compressed file.

20. The device of claim 16, wherein execution of the computer-executable BIOS code by the processor causes the processor to verify the image based on the digital signature accompanying the image by verifying that the image was created or approved by a trusted source using cryptographic techniques.

* * * * *